Figure 1:
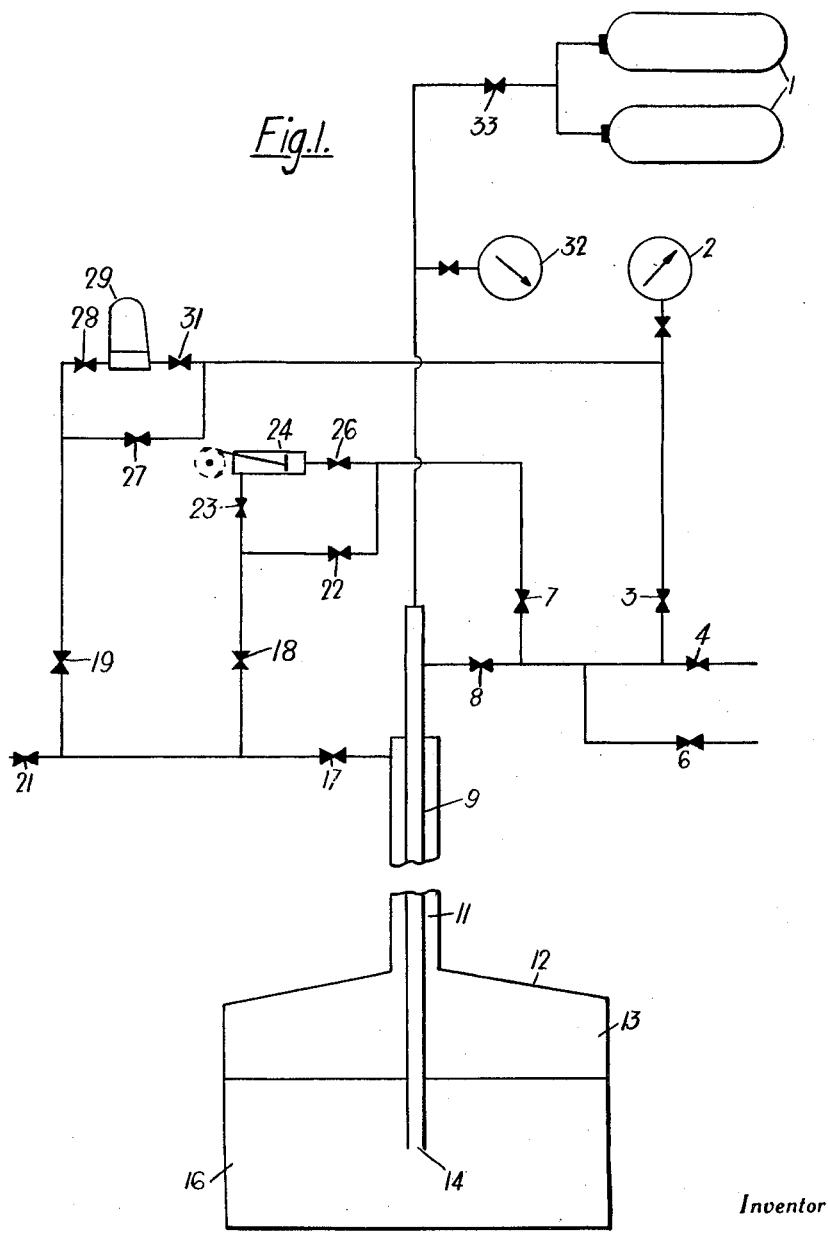

Dec. 15, 1964 E. L. HARLEY 3,161,052
MEASUREMENT OF INTERFACIAL LEVELS
Filed May 6, 1963 2 Sheets-Sheet 2

Inventor
ERNEST LESLIE HARLEY

By Cushman, Darby & Cushman
Attorneys

United States Patent Office 3,161,052
Patented Dec. 15, 1964

3,161,052
MEASUREMENT OF INTERFACIAL LEVELS
Ernest Leslie Harley, Norton-on-Tees, England, assignor to Imperial Chemical Industries Limited, London, England, a corporation of Great Britain
Filed May 6, 1963, Ser. No. 278,212
Claims priority, application Great Britain, May 11, 1962, 18,190/62
7 Claims. (Cl. 73—302)

This invention relates to the measurement of interfacial levels. A similar method and apparatus for measurement of interfacial levels is described in U.S. Patent No. 3,049,921, dated August 21, 1962.

Many methods have been proposed for the measurement of the level of an interface between two liquid layers contained in tanks and the like. These methods however usually rely either on a substantial difference in some physical or chemical property between the two layers, for example, float gauges where there is a substantial difference in the densities, and/or on the accessibility of the liquids in the tank, for example, tank dipping.

According to the present invention a method is provided for determining the level of an interface between two liquid layers by determining that pressure which is just sufficient to introduce from the level of the interface a column of a measuring liquid having density characteristics similar to the liquid of one layer, hereinafter referred to as the first layer, the said column, under the said pressure, extending into the other liquid layer to a known level, this other liquid layer being herein referred to as the second layer.

By a liquid of similar density characteristics to that comprising the first liquid layer is meant, for the purposes of the present invention, a liquid having characteristics of density and change of density with pressure and temperature which approximate to those of the liquid comprising the first liquid layer to within the limits of accuracy desired by the operation of the present invention. Preferably, therefore, the liquid to be forced into the other layer, hereinafter called the measuring liquid, is the same liquid as the liquid comprising the first liquid layer.

The measuring liquid may suitably be forced to the said known level through a pipe projecting into the second liquid layer. The said known level may conveniently be a level at which the measuring liquid is allowed to escape, without substantial pressure loss, from the pipe into the second liquid layer, for example, through a hole of sufficient size to avoid an appreciable pressure drop as liquid bubbles through it. This facilitates the required pressure measurement because the pressure required to force the measuring liquid down the pipe will then increase until the measuring liquid begins to escape into the second liquid layer when the pressure will reach a relatively steady maximum.

Preferably the measuring liquid is forced from the first liquid layer because the liquid on its side of the interface inside and outside the pipe will then be the same except for the applied pressure. This applied pressure will be approximately equal to the difference in densities of the two liquids multiplied by the vertical distance between the known level and the interface.

Preferably all measurements for example of pressure, temperature and levels are made when the measuring liquid is in equilibrium at the said known level. In a system comprising a pipe projecting into the second liquid layer in which the known level is one at which liquid can escape from the pipe into the said layer, as hereinbefore described, the equilibrium point is conveniently reached and maintained by slowly increasing the force applied to the measuring liquid until further increase produces no substantial increase of pressure in the pipe. At this stage measuring liquid is flowing from the pipe and passing into the second liquid layer. The force applied to the measuring liquid, and hence the flow of liquid, is then slowly reduced until further reduction produces no reduction of pressure in the pipe. The measuring liquid is then just at the known level and the system is in equilibrium and the required measurements may be made under these conditions.

The process of the present invention may be adapted to apply to many diverse systems. Four such adaptations are described in the following embodiments.

A system in which propylene is stored under the pressure of a head of brine is shown in FIGURE 1 of the accompanying drawings and comprises an underground cavern 12 which is fitted with two concentric pipes 9 and 11. Pipe 9 dips into the layer of brine 16 and is full of brine, and pipe 11 is full of propylene 13 under the pressure of the head of brine in pipe 11. In order to find the level of the propylene/brine interface in the cavern the following procedure was followed.

Brine valve 4, brine drain valve 6 and propylene valve 21 were closed in order to isolate the system. The differential pressure cell 29 was isolated by valves 28 and 31. A supply of inert gas 1 was connected to pipe 9 and isolated by valve 33. The by-pass valve 22 to metering pump 24 was opened and valves 7, 8, 17 and 18 were also opened allowing propylene to flow from pipe 11 to pipe 9 and eventually the interfaces settled at the same height in both pipe 9 and cavity 12 and the pressure at gauges 2 and 32 were then noted. The differential pressure cell by-pass and isolation valves 3, 19, 27, 28 and 31 were then opened and the cell reading was zero. Valve 27 was then closed and valves 23 and 26 were opened. The pump 24 was then started and its stroke was increased slowly the by-pass being slowly shut by valve 22. Differential pressure and well-head temperature readings were taken at frequent intervals until the differential pressure readings substantially ceased to increase as propylene bubbled through the hole 14 into the layer of brine 16. The pump stroke was then gradually decreased until a steady differential pressure reading was obtained. Equating the pressures on each side of the level of the hole 14 then gave the head of brine above the hole 14 and hence the position of the interface in the cavity 12 with respect to hole 14 because the distance between the tops of pipes 9 and 11, and the densities of the propylene and the brine were known, and because pipe 9, pipe 11 and cavity 13 were all full of propylene. The metering pump and differential pressure cell were then shut off and isolated and the system was then returned to normal using nitrogen from the cylinders 1 to expel the propylene from pipe 9 and venting pipe 9 to allow it to refill with brine. A suitable method for calculating the interfacial level after the pressure measurements are taken is described in said Patent No. 3,049,921.

Figure 2:
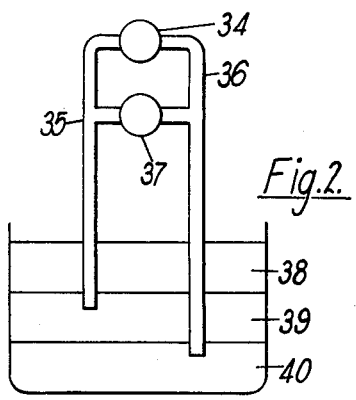
Figure 3:
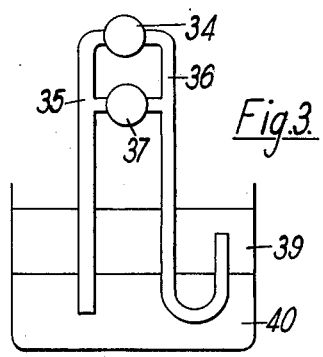
Figure 4:
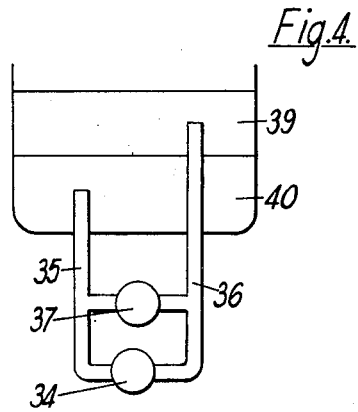

Three further embodiments are illustrated diagrammatically in FIGURES 2, 3 and 4 of the accompanying drawings. In each case a power siphon, comprising a pump 34 and separate pipes 35 and 36 leading from the pump into respectively the measuring liquid and the second layer, and which is kept substantially full of the measuring liquid when measurements are being taken, is used in conjunction with a pressure gauge 37 for measuring the difference in pressure between the two pipes. As shown in FIGURES 2, 3 and 4, the pipes 35 and 36 are connected together through the pump 34 to form a substantially U-shaped liquid column, while the addition of the pressure gauge and connecting pipes at 37 provides a substantially A-shaped liquid column. Numbers 38–40 indicate various liquid layers.

In the embodiment of FIGURE 2, there are three liquid levels 38, 39 and 40 and as shown, the separate pipes 35 and 36, together with the pump 34 and gauge 37, are disposed above the vessel holding the three liquids. In the embodiment of FIGURE 3, the pipes and pumps are disposed above the vessel and liquid level as in FIGURE 2, but in this embodiment, only two liquid levels 39 and 40 are shown and in this embodiment, the effective length of pipe 35 extends into the lower liquid; while pipe 36 is provided with a substantially J-shaped ending such that the effective measuring length of pipe 36 is less than pipe 35, extending into the upper liquid 39. In the embodiment of FIGURE 4, the measuring apparatus is disposed below or beneath the vessel holding the two liquids 39 and in this case, the shorter pipe 35 is adapted to measure the lower liquid 40, while the longer pipe 36 is disposed for the measurement of the upper liquid 39.

The pressure applied by the pump is increased until the measuring liquid just escapes from the end of the pipe 36. This pressure may be read off the gauge and used to calculate the vertical distance between the pipe end and the interface as afore indicated.

Alternatively, the gauge may be calibrated to give the position of the interface directly.

It will be seen from the embodiments that the invention may be used in open or enclosed storage vessels and where more than two liquid layers are present. Liquid from the layer above or below the interface may be used as the measuring liquid, according to whichever is least corrosive, most easily pumped, etc. The use of this method of determining the position of an interface rather than any method involving the introduction of a gas to the system may, for example offer advantages where the absence of gases is desired.

I claim:

1. In an apparatus for determining a level of an interface between two liquid layers by determining that pressure which is just sufficient to introduce from the level of the interface a column of a measuring liquid having density characteristics similar to one liquid layer herein referred to as the first layer, the said column under said pressure extending into the other liquid layer to a known level, the other liquid layer being herein referred to as the second layer, the improvement wherein said column is substantially U-shaped.

2. An apparatus according to claim 1 for determining the level of an interface between two liquid layers wherein said measuring liquid is the liquid in the first layer.

3. An apparatus according to claim 2 in which the first liquid is forced from the first liquid layer to a known level in the second liquid layer by means of a power siphon comprising a pipe to convey liquid from the first liquid layer to a pump, the pump, and a second and separate pipe to convey liquid from the pump to the known level in the second liquid layer, the known level being at an aperture in the second pipe from which liquid can escape without substantial pressure drop into the second liquid layer, the said power syphon being equipped with a means for determining the difference between the pressures in the two pipes, and being kept substantially full of the measuring liquid during the measuring process.

4. An apparatus according to claim 3 wherein the means for determining the difference between the pressures in the two separate pipes comprises a pressure gauge connected across said pipes in parallel with respect to the power syphon and thereby forming a substantially A-shaped liquid column.

5. An apparatus according to claim 3 wherein there are three liquid layers and wherein said apparatus is disposed above the vessel containing the respective liquids.

6. An apparatus according to claim 3 wherein there are two liquid layers, the apparatus is disposed above the vessel containing the respective liquids and wherein the second pipe terminates within said vessel in a substantially J-shaped configuration.

7. An apparatus according to claim 3 wherein there are two liquid layers and the apparatus is disposed below the vessel containing the two respective liquids.

References Cited by the Examiner
UNITED STATES PATENTS
3,049,921  8/62  Shiver _____ 73—302

ISAAC LISANN, *Primary Examiner.*